United States Patent [19]

Davis, Jr.

[11] 3,954,228
[45] May 4, 1976

[54] MISSILE GUIDANCE SYSTEM USING AN INJECTION LASER ACTIVE MISSILE SEEKER

[75] Inventor: William A. Davis, Jr., Huntsville, Ala.

[73] Assignee: The United States of America as represented by the Secretary of the Army, Washington, D.C.

[22] Filed: Feb. 23, 1968

[21] Appl. No.: 707,888

Related U.S. Application Data

[63] Continuation-in-part of Ser. No. 508,173, Nov. 16, 1965, abandoned.

[52] U.S. Cl. .......................... 244/3.16; 250/203 R; 250/338
[51] Int. Cl.² ..................... F41G 7/00; G01J 1/20
[58] Field of Search .................. 244/3.14, 3.16; 250/203 R, 338; 331/94.5

[56] References Cited
UNITED STATES PATENTS
3,504,979    4/1970    Stephany ........................ 356/172

*Primary Examiner*—Maynard R. Wilbur
*Assistant Examiner*—S. C. Buczinski
*Attorney, Agent, or Firm*—Nathan Edelberg; Robert P. Gibson; James T. Deaton

[57] ABSTRACT

A missile guidance system utilizing an integrated active missile infrared seeker including an injection laser transmitter, a semiconductor detector and a conical scanning acquisition and guidance system.

3 Claims, 3 Drawing Figures

William A. Davis, Jr.
*INVENTOR.*

MISSILE GUIDANCE SYSTEM USING AN INJECTION LASER ACTIVE MISSILE SEEKER

DEDICATORY CLAUSE

The invention described herein may be manufactured, used, and licensed by or for the Government for governmental purposes without the payment to me of any royalty thereon.

CROSS-REFERENCE TO RELATED APPLICATION

This application is a continuation-in-part of applicant's copending application Ser. No. 508,173, filed Nov. 16, 1965, now abandoned.

This invention relates to a missile guidance system generally and more specifically to a system utilizing an integrated active missile infrared seeker including an injection laser transmitter, a detector and a conical scanning system.

The missile guidance system of the present invention has a use primarily in a forward area air defense guided missile system. Another application of potential significance is in an antitank or assault role where less power would be required because of the smaller ranges involved. Also, the use of infrared frequencies permit secrecy of operation against the observing eye of the enemy. This guidance system is also amenable to an effective identification friend-or-foe (IFF) system. For example, friendly aircraft could be provided with corner reflectors to give identifying signal enhancement.

This guidance system provides a capability against targets at all aspect angles. In other words, it is not limited to the tail chase mode where jet aircraft provide sufficient infrared (IR) irradiance for passive homing. A high firing rate can be realized with this guidance system because there is no ground equipment tie-up during the missile time-of-flight. Since the missile is autonomous after launch, the ground crew can divert their attention to moving or additional engagements as soon as launch occurs. This contrasts with the ground equipment tie-up involved with any semiactive homing, command or beamrider guidance system.

When compared to radar systems, the advantage of security of launch site is realized. The narrow beam IR radiation from the injection laser active missile seeker, to be described hereinbelow, would be highly secure because of higher collimation, whereas, radiating devices in the radio frequency portion of the spectrum are susceptible to detection and engagement by anti-radiation missiles or other ground fire. Along with the aforementioned narrow beam IR radiation and the ease of modulation of the semiconductor laser, a high degree of immunity to both natural and man-made interference, such as electronic counter measures (ECM), can be realized.

The detection and scanning system used in the present invention can take several forms. Some options available are that the detector could be a photomultiplier type tube or photodiode, the former giving greatest sensitivity and the latter offering maximum simplicity and ruggedness. A more advanced technique is that of a solid state photomultiplier which largely combines the desirable properties of the two types of detector. Gallium arsenide has further been used as a detector as shown on page 418 of a book entitled "Elements of Infrared Technology" published by John Wiley and Sons, Inc., in 1962 and written by Kruse, McGlauchlin and McQuistan with Library of Congress Catalog Number 62-8776. Alternatively, a spinning reticle or a conical scanning system could be used. Scanning can be implemented with a magnetically deflectable photomultiplier tube or with a mosaic detector system.

It is characteristic of a semiconductor laser that it is small, compact and highly efficient, and can easily be modulated up to microwave frequencies and produce a fair amount of power continuously. One of the most attractive features of the semiconductor device is the ease of modulation; the radiation can be amplitude modulated by simply modulating the diode current, thus eliminating bulky flashtube processes of conventional lasers. Semiconductor lasers are pumped from a power source that delivers a high current at low voltage. In conventional lasers, the population is inverted throughout the entire volume of the laser material; in a semiconductor laser, only the region in the vicinity of the junction is inverted. The semiconductor laser can be operated as either a pulsed source or as a continuous source. When cooled to 20°K or lower (thereby providing a cryogenic environment), semiconductor diodes have been made to deliver an output of more than two watts of continuous power. These features, along with the light, compact laser itself, make this invention very desirable for missile terminal guidance.

This invention utilizes semiconductor lasers of the type described in an article entitled "Semiconductor Lasers", by Theodore M. Quist, International Science and Technology, Feb. 1964.

It is an object of this invention to provide a lightweight missile guidance system.

Another object of the present invention is to provide a high degree of immunity to both natural and man-made interference such as ECM and furnishes an effective IFF system.

Other objects and the principles of the present invention will be better understood from the following more detailed discussion taken in conjunction with the accompanying drawings wherein.

Figure 1:
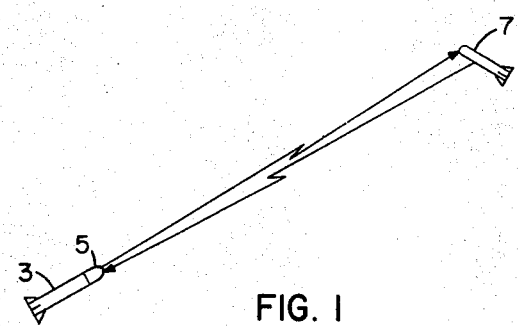
FIG. 1 is an illustration of a missile utilizing a laser seeker according to the invention for intercepting a target missile.

In FIG. 1 there is shown the in-flight system operation of missile 3 utilizing the injection laser active missile seeker located in nose cone 5. The injection laser active missile seeker sends out narrow beams of infrared radiation striking the target missile or aircraft 7. The radiant energy is diffuse reflected back to and received by a scanning system and detected by a photodiode detector located in nose cone 5. A guidance and tracking error signal generator provides signals to a guidance and tracking control system for guiding missile 3 to target missile or aircraft 7.

Figure 2:
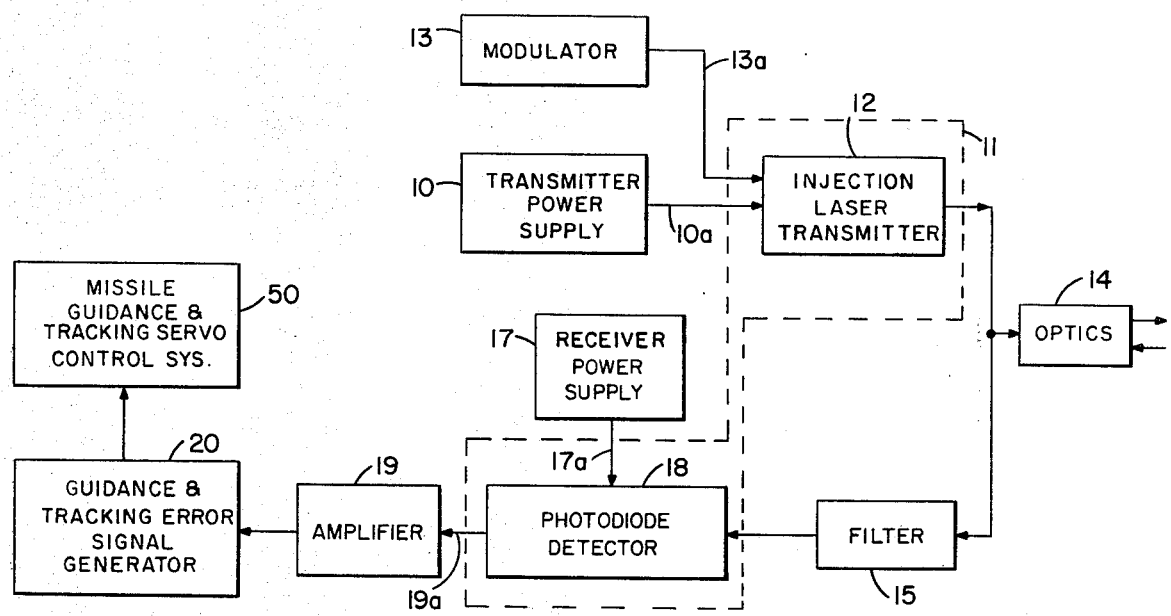
FIG. 2 is a block diagram of a guidance system according to the present invention.

The guidance system as shown in FIG. 2 includes a transmitter power supply 10, a modulator 13, an injection laser transmitter 12, a photodiode detector 18, a modified cassegrainian type optical system 14, a sprectral filter 15, a receiver power supply 17, an amplifier 19, a guidance and tracking error signal generator 20 and a guidance and tracking control system 50, including an appropriate scanning system. The guidance and tracking control system 50 guides the missile to the target according to signals reflected from the target that are processed in the guidance and tracking error signal generator 20. An example of a conventional error signal generator and scanning system suitable for use in the present system can be found in a book entitled "Introduction to Radar Systems" by Merrill L. Skolnik on page 166 and published by McGraw-Hill Book Company in 1962, or in U.S. Pat. No. 2,448,007 issued to W. A. Ayres.

Figure 3:
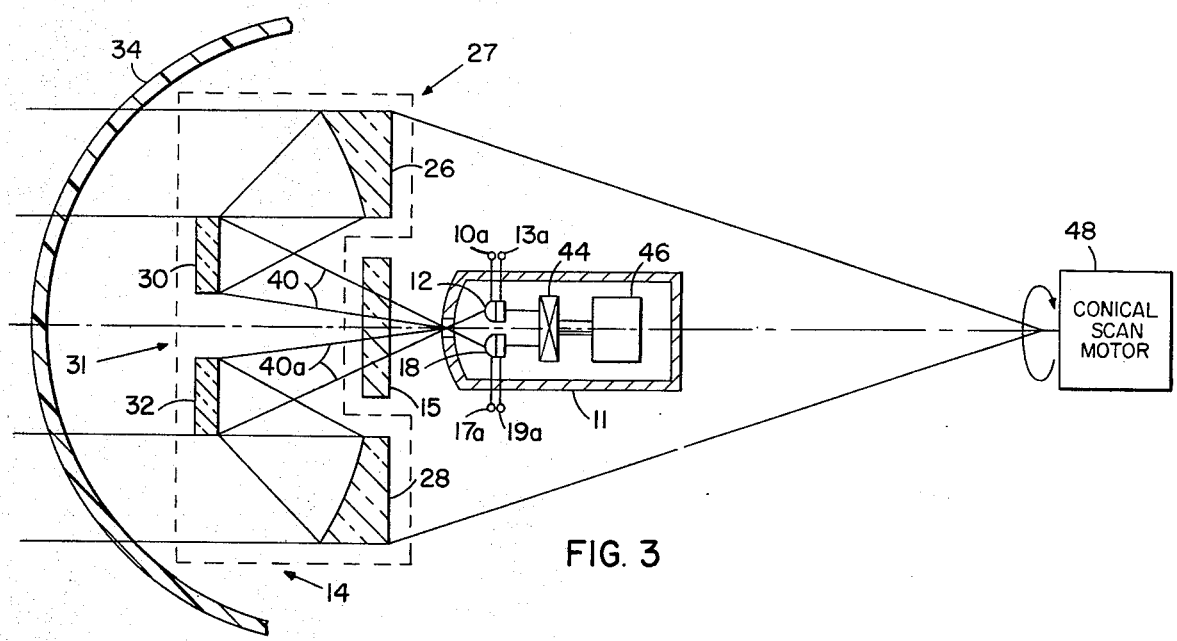
FIG. 3 is a longitudinal cross-sectional view of an injection laser and accompanying optics made in accordance with the principle of this invention.

In FIG. 3 the injection laser active missile seeker and its components are shown. In this embodiment of the invention, injection laser transmitter 12 and a photodiode semiconductor detector 18 are eccentrically mounted and disposed in a cryogenic environment within a Dewar vessel 11. Transmitter 12 and detector 18 are nutated, about their eccentric axis, by a cryogenic motor 46, through gearing 44, that nutates both the transmitter and detector at the same speed. Terminals 10a and 13a represent connections for interconnecting the transmitter power supply 10 and modulator 13 to transmitter 12, and terminals 17a and 19a represent connections for interconnecting the receiver power supply 17 and amplifier 19 to detector 18. Spectral filter 15 and optical system 14 are shown, including portions 26 and 28 of an open centered primary parabolic mirror 27 and portions 30 and 32 of an open centered circular secondary flat mirror 31. The mirrors are fully-silvered to provide maximum reflection. The optical system may, for example, be of the type shown in U.S. Pat. No. 2,823,612 issued to A. Cox et al. Dome 34 can be made of translucent material that is well known in the art.

In operation, a pulse of infrared (IR) energy, illustrated as rays 40, is transmitted from eccentrically mounted rotating injection laser 12 through spectral filter 15 and is reflected by mirror portion 30 to mirror portion 26 and re-reflected as parallel rays toward a target. According to conical scanning systems, the radiation lobe is rotated about the axis of the parabolic reflector 27 until 180° later, injection laser 12 transmits IR energy rays 40a to mirror portions 32 and 28, and received radiation from a target is reflected and re-reflected to converge upon photodiode detector 18. The pulsed IR energy is continually swept around the circular reflecting mirrors by the rotating injection laser and is reflected from a target back through the mirrors to the rotating photodiode detector. The energy impinging upon detector 18 generates an error signal which is amplified by amplifier 19 and is fed to signal generator 20, which generates a guidance and tracking error signal in accordance with the direction and distance the target is located off the rotation axis of the conical scan. The guidance and tracking error signal generated in block 20 is fed to the missile guidance and tracking control system 50 for guiding the missile to the target. Conical scan motor 48 rotates the combination of Dewar vessel 11 and optical system 14 at a typical conical-scan rotational speed. Spectral filtering is employed to enhance signal-to-noise ratio. A continuous wave signal could be used, but the pulsed mode appears preferable because of less power consumption in an optimized system.

Because of the higher efficiency achievable at low temperatures, with the resulting saving in space weight, the injection laser may be cooled to liquid nitrogen temperature. Conventional cryogenic techniques, as currently practiced in missiles, are used, including the packaging of the transmitting and detecting diodes 12 and 18 in Dewar vessel 11 to maintain the desired low temperature.

Preliminary calculations indicate that current injection laser technology will provide a range capability of 1500–2000 meters. These calculations were based on the use of a cooled gallium arsenide laser and a silicon detector. Because of their high efficiency, the packaging of injection laser systems into a small missile is feasible. Since modulation can be effected via the input current to the diode, the pulse duration, pulse rate frequency and any desired coding can be readily obtained. The injection laser active missile seeker is most desirable for terminal guidance in conjunction with other forms of boost-phase and mid-course guidance.

The injection laser active missile seeker may be employed in both air defense and surface-to-surface missile systems. This application requires less power for many systems because of the smaller ranges involved on surface targets. It can, therefore, be packaged in a much smaller configuration than the guidance system.

It is believed apparent from the foregoing that a new and novel system of terminal guidance has been provided that is highly efficient and reliable and a vast improvement in the state of the art. Although a preferred embodiment of the invention has been shown, obviously, many modifications and variations of the present invention are possible in the light of the above teachings.

I claim:

1. An active missile guidance system mounted in the nose portion of a missile and comprising: an injection laser transmitter enclosed in a cryogenic environment and having a power supply and modulator connected thereto for providing a pulsed beam of infrared radiation therefrom; a photodiode infrared detector having a power supply connected thereto and displaced alongside said transmitter inside said cryogenic environment for receiving pulsed radiation reflected from a target; a circular optical system disposed adjacent said transmitter and said detector for focusing transmitted and reflected radiation to and from said transmitter and photodiode infrared detector; a conical scanning means including said injection laser transmitter and said photodiode infrared detector being eccentrically mounted in the proximity of a central axis of said circular optical system and means for nutating said injection laser transmitter and photodiode detector in a manner whereby transmitted and reflected pulsed beams of radiation may be transmitted and received through said circular optical system, said conical scanning means further including a conical scan motor for rotating said optical system, transmitter and detector as a unit in a circular manner; means interconnected to said photodiode detector and responsive to error signals from said photodiode detector for amplifying and generating guidance and tracking error signals for said missile and wherein in-flight guidance of said missile is possible toward said target at all aspect angles to thereby provide active homing of said missile on said target.

2. An active missile guidance system as set forth in claim 1 wherein said injection laser transmitter is a gallium arsenide semiconductor.

3. An active missile guidance system as set forth in claim 2 wherein said infrared detector is a silicon detector.

* * * * *